United States Patent
Xu

(10) Patent No.: US 10,568,122 B2
(45) Date of Patent: Feb. 18, 2020

(54) METHOD FOR INFORMING AVAILABLE RESOURCE FOR PDSCH, METHOD FOR DETERMINING AVAILABLE RESOURCE FOR PDSCH, BASE STATION AND UE

(71) Applicant: Guangdong OPPO Mobile Telecommunications Corp., Ltd., Dongguan, Guangdong (CN)

(72) Inventor: Hua Xu, Ottawa (CA)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/515,664

(22) Filed: Jul. 18, 2019

(65) Prior Publication Data
US 2019/0342906 A1 Nov. 7, 2019

Related U.S. Application Data

(63) Continuation of application No. PCT/CN2018/073220, filed on Jan. 18, 2018.
(Continued)

(51) Int. Cl.
*H04W 72/12* (2009.01)
*H04L 5/00* (2006.01)
*H04W 72/04* (2009.01)

(52) U.S. Cl.
CPC ....... *H04W 72/1273* (2013.01); *H04L 5/0007* (2013.01); *H04W 72/0446* (2013.01); *H04W 72/0453* (2013.01)

(58) Field of Classification Search
CPC ......... H04W 72/1273; H04W 72/0453; H04W 72/0446; H04W 72/04; H04W 72/12;
(Continued)

(56) References Cited

U.S. PATENT DOCUMENTS 8,705,461 B2 * 4/2014 Bala ............... H04L 5/0007
370/329
10,306,568 B2 * 5/2019 Kim ............... H04W 72/04
(Continued)

FOREIGN PATENT DOCUMENTS

CN 101500310 A 8/2009
CN 102918788 A 2/2013
(Continued)

OTHER PUBLICATIONS

Extended European search report issued in corresponding European application No. 18741349.7 dated Nov. 20, 2019.

*Primary Examiner* — Sharad Rampuria
(74) *Attorney, Agent, or Firm* — Young Basile Hanlon & MacFarlane, P.C.

(57) ABSTRACT

A method for informing available resource for PDSCH, a method for determining available resource for PDSCH, a base station and a user equipment are provided. The method for informing available resource for PDSCH includes: signaling, by a base station to a user equipment, information about the available resource for PDSCH in a scheduling unit according to a reserved resource allocation of the scheduling unit. The reserved resource allocation of the scheduling unit indicates in frequency domain one or more resource sets and indicates in time domain a part of OFDM symbols within the one or more resource sets of the scheduling unit as a reserved resource set, and the information about the available resource for PDSCH in the scheduling unit includes information representing the reserved resource allocation of the scheduling unit.

26 Claims, 4 Drawing Sheets

Related U.S. Application Data

(60) Provisional application No. 62/448,537, filed on Jan. 20, 2017.

(58) Field of Classification Search
CPC .... H04W 76/00; H04L 5/0007; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2008/0084815 A1* | 4/2008 | Shin | H04L 5/0007 370/203 |
| 2010/0040009 A1* | 2/2010 | Gaal | H04W 28/26 370/329 |
| 2015/0245323 A1 | 8/2015 | You et al. | |

FOREIGN PATENT DOCUMENTS

| | | |
|---|---|---|
| CN | 105827371 A | 8/2016 |
| WO | 2008045336 A2 | 4/2008 |

\* cited by examiner

METHOD FOR INFORMING AVAILABLE RESOURCE FOR PDSCH, METHOD FOR DETERMINING AVAILABLE RESOURCE FOR PDSCH, BASE STATION AND UE

CROSS-REFERENCE TO RELATED APPLICATION(S)

The present application is a continuation application of International PCT Application No. PCT/CN2018/073220, filed on Jan. 18, 2018, which claims priority to U.S. Provisional Application No. 62/448,537 filed on Jan. 20, 2017, the entire disclosure of both of which are hereby incorporated by reference.

TECHNICAL FIELD

The present disclosure relates to the communication technology field, and more particularly to a method for informing available resource for PDSCH, a method for determining available resource for PDSCH, a base station and a user equipment.

BACKGROUND

In LTE, the available resource, such as the starting symbol for physical downlink shared channel (PDSCH) is the same across the whole system bandwidth as the control region takes the whole of the first or several symbols of a subframe, such that it is easy for the base station to inform a user equipment (UE) of the starting of orthogonal frequency division multiplexing (OFDM) symbols for PDSCH.

However, in near radio (NR) wireless system, the situation changes since the control region may only occupy a portion of the frequency bandwidth of the whole system bandwidth. The motivation for this is to save the UE efforts to search for its physical downlink control channel (PDCCH) across the whole system bandwidth which could be very wide compared with that of LTE, especially at higher frequency. In this case, how to inform the UE the available resource for PDSCH becomes an issue.

SUMMARY

The present disclosure aims to solve at least one of existing problems in the related art to at least extent.

Accordingly, a first objective of the present disclosure is to provide a method for informing available resource for PDSCH.

A second objective of the present disclosure is to provide a method for determining available resource for PDSCH.

A third objective of the present disclosure is to provide a base station.

A fourth objective of the present disclosure is to provide a UE.

To achieve the above objectives, implementations of a first aspect of the present disclosure provide a method for informing available resource for PDSCH. The method includes: signaling, by a base station to a user equipment, information about the available resource for PDSCH in a scheduling unit according to a reserved resource allocation of the scheduling unit; in which the reserved resource allocation of the scheduling unit indicates in frequency domain one or more resource sets and indicates in time domain a part of OFDM symbols within the one or more resource sets of the scheduling unit as a reserved resource set, and the information about the available resource for PDSCH in the scheduling unit includes information representing the reserved resource allocation of the scheduling unit, in which the reserved resource set would not to be used for transmitting the PDSCH.

To achieve above objectives, implementations of a second aspect of the present disclosure provide a method for determining available resource for PDSCH. The method includes: receiving, by the user equipment from a base station, information about the available resource for PDSCH in the scheduling unit, in which the information about the available resource for PDSCH in the scheduling unit includes information representing a reserved resource allocation of the scheduling unit, in which the reserved resource allocation of the scheduling unit indicates in frequency domain one or more resource sets and indicates in time domain a part of OFDM symbols within the one or more resource sets of the scheduling unit as a reserved resource set, the reserved resource set would not to be used for transmitting the PDSCH; and determining, by the user equipment, the available resource for PDSCH in the scheduling unit according to the information about the available resource for PDSCH in the scheduling unit.

To achieve above objectives, implementations of a third aspect of the present disclosure provide a base station. The base station includes a processor, a memory for storing instructions executable by the processor. The processor is configured to signal to a user equipment information about the available resource for PDSCH in a scheduling unit according to a reserved resource allocation of the scheduling unit. The reserved resource allocation of the scheduling unit indicates in frequency domain one or more resource sets and indicates in time domain a part of OFDM symbols within the one or more resource sets of the scheduling unit as a reserved resource set, and the information about the available resource for PDSCH in the scheduling unit includes information representing the reserved resource allocation of the scheduling unit, the reserved resource set would not to be used for transmitting the PDSCH.

To achieve above objectives, implementations of a fourth aspect of the present disclosure provide a UE. The UE device includes a processor, a memory for storing instructions executable by the processor. The processor is configured to receive from a base station information about the available resource for PDSCH in the scheduling unit, in which the information about the available resource for PDSCH in the scheduling unit includes information representing a reserved resource allocation of the scheduling unit, and the reserved resource allocation of the scheduling unit indicates in frequency domain one or more resource sets and indicates in time domain a part of OFDM symbols within the one or more resource sets of the scheduling unit as a reserved resource set which would not to be used for transmitting the PDSCH; and determine the available resource for PDSCH in the scheduling unit according to the information about the available resource for PDSCH in the scheduling unit.

BRIEF DESCRIPTION OF DRAWINGS

Above and/or other aspects and advantages of the present disclosure will become clearer and easier to understand from following description to implementations with reference to drawings, in which.

DETAILED DESCRIPTION

Reference will now be made in detail to exemplary implementations, examples of which are illustrated in the accompanying drawings, in which the same or similar reference numbers throughout the drawings represent the same or similar elements or elements having same or similar functions. Implementations described below with reference to drawings are merely exemplary and used for explaining the present disclosure, and should not be understood as limitation to the present disclosure.

With respect to problem that the starting symbol for PDSCH may not be the same anymore for different Physical Resource Blocks (PRBs) in the NR wireless system, respective implementations of the present disclosure provide a method for informing available resource for PDSCH, such that the base station in an NR wireless system can easily inform the UE of the available resource for PDSCH.

In the following, a method for informing available resource for PDSCH, a method for determining available resource for PDSCH, a base station and a UE according to implementations of the present disclosure are described with reference to drawings.

Figure 1:
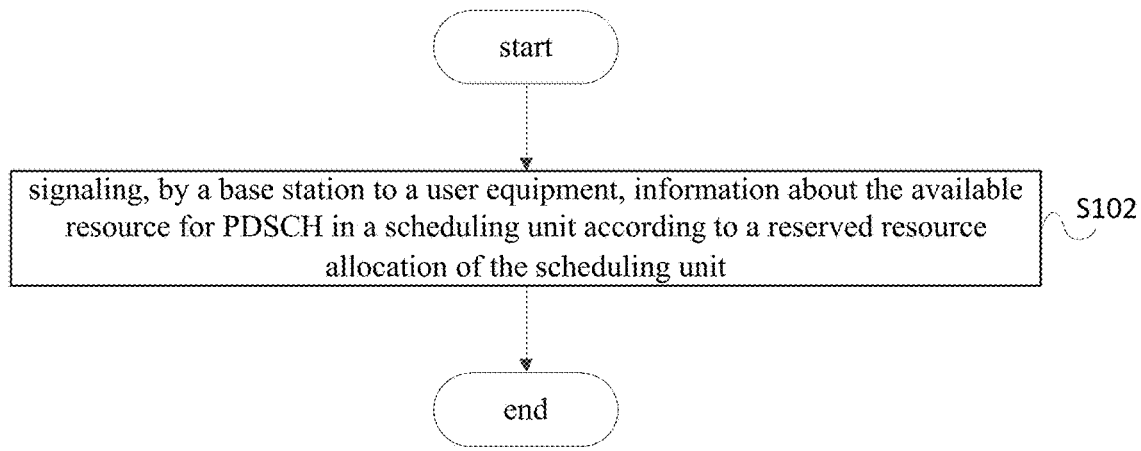
FIG. 1 is a flow chart illustrating a method for informing available resource for PDSCH according to an implementation of the present disclosure.

The present disclosure provides a method for informing available resource for PDSCH, which can be applied in a base station of an NR wireless system. FIG. 1 is a flow chart showing a method for informing available resource for PDSCH according to an implementation of the present disclosure. As illustrated in FIG. 1, the method for informing available resource for PDSCH includes the followings.

At block S102, signaling, by a base station to a user equipment, information about the available resource for PDSCH in a scheduling unit according to a reserved resource allocation of the scheduling unit.

The reserved resource allocation of the scheduling unit indicates in frequency domain one or more resource sets and indicates in time domain a part of OFDM symbols within the one or more resource sets of the scheduling unit as a reserved resource set, and the information about the available resource for PDSCH in the scheduling unit includes information representing the reserved resource allocation of the scheduling unit. The reserved resource set would not to be used for transmitting the PDSCH.

The scheduling unit may be a slot or a subframe, which is determined according to specific applications.

The reserved resource set includes blocks of time-frequency resources configured for DL control channel transmission or the like. The reserved resource set can be classified into two types: first type, a control resource set configured for the user equipment; second type, a resource set including resources reserved for one or more user equipment other than the user equipment, which may overlap with a PDSCH resource allocation of the user equipment, but cannot be used by the user equipment.

Figure 2:
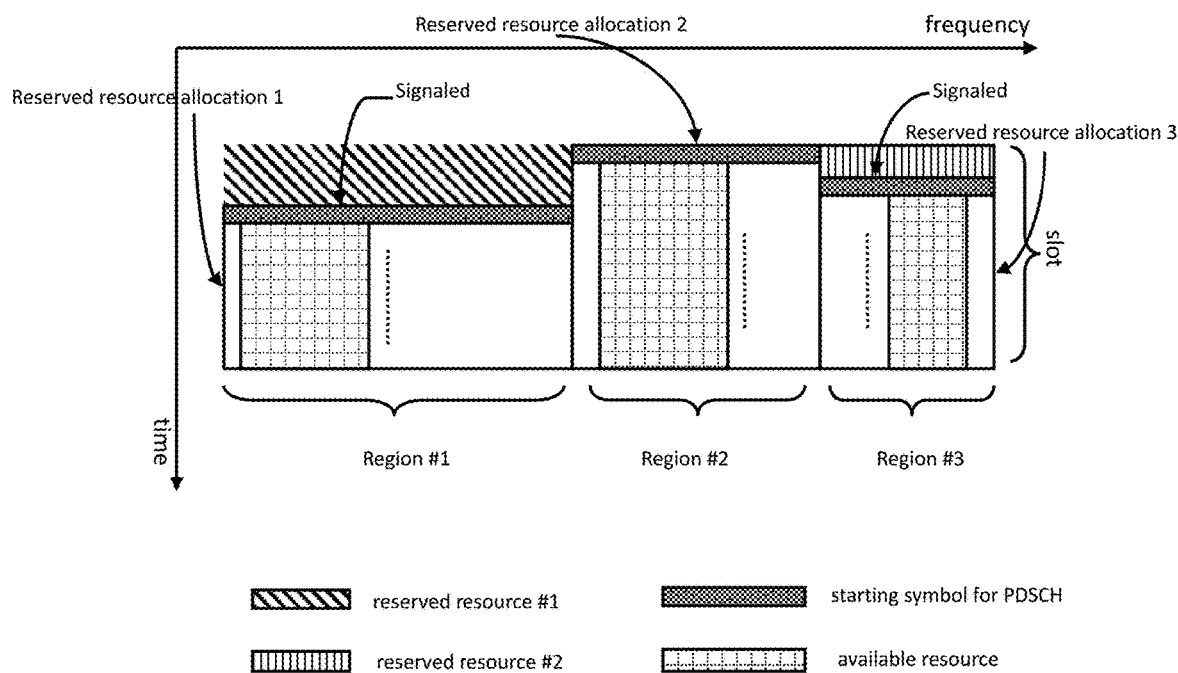
FIG. 2 is a schematic diagram illustrating a reserved resource allocation of a scheduling unit according to an implementation.

FIG. 2 is a schematic diagram showing a reserved resource allocation of a scheduling unit according to an implementation of the present disclosure. As illustrated in FIG. 2, among the reserved resources, some resources are configured for the UE to receive its control channels including UE-specific channels and/or common control channels, as illustrated in reserved resources #1. Other resources are reserved for one or more UEs other than this UE, but could overlap with PDSCH transmissions of this UE in the frequency region, as illustrated in reserved resources #2. In other words, the reserved sources #1 form a reserved source set which is configured for the same UE, but the reserved sources #2 form a reserved source set which including resources configured for one or more UEs other than the UE.

Beside these two kinds of reserved resource allocation illustrated in regions #1 and #3, FIG. 2 also shows another example of reserved resource allocation. As illustrated in region #2, there is no DL PDCCH transmitted in the slot, i.e., there is no reserved resource set allocated in region #2 and all the resources in this region can be used for transmitting the PDSCH.

The information about available resource for PDSCH in the scheduling unit includes information representing the reserved resource allocations 1, 2, 3 of the scheduling unit. When the base station signals the information to the UE, the UE can obtain the reserved resource allocation. In some implementations, the information representing the reserved resource allocations 1, 2, 3 of the scheduling unit may be a bitmap.

Figure 3:
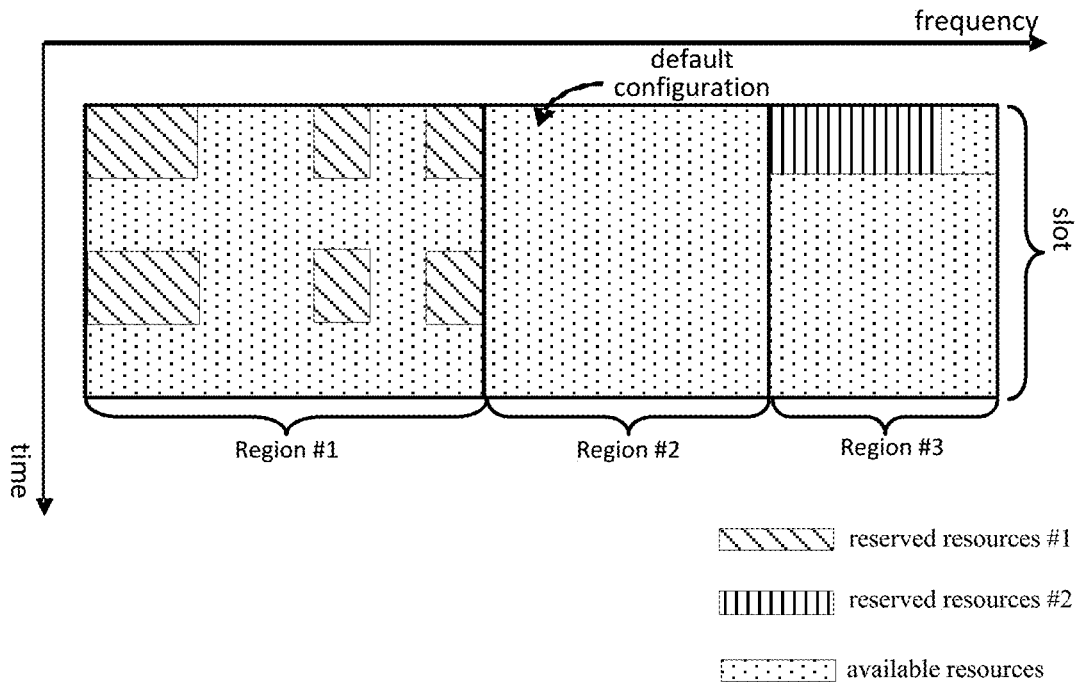
FIG. 3 is a schematic diagram illustrating a reserved resource allocation of a scheduling unit according to another implementation.

Although in the implementation discussed with reference to FIG. 2, the reserved resources are continuous in each region, the reserved resources can be allocated discretely in practice. For example, FIG. 3 illustrates another reserved resource allocation according to an implementation of the present disclosure. As illustrated in FIG. 3, in region #1, the reserved resources #1 are allocated discretely in the frequency domain and the time domain. In region #2, there is not reserved resource allocated therein. In region #3, the reserved resources #2 are allocated continuously in the frequency domain.

Figure 4:
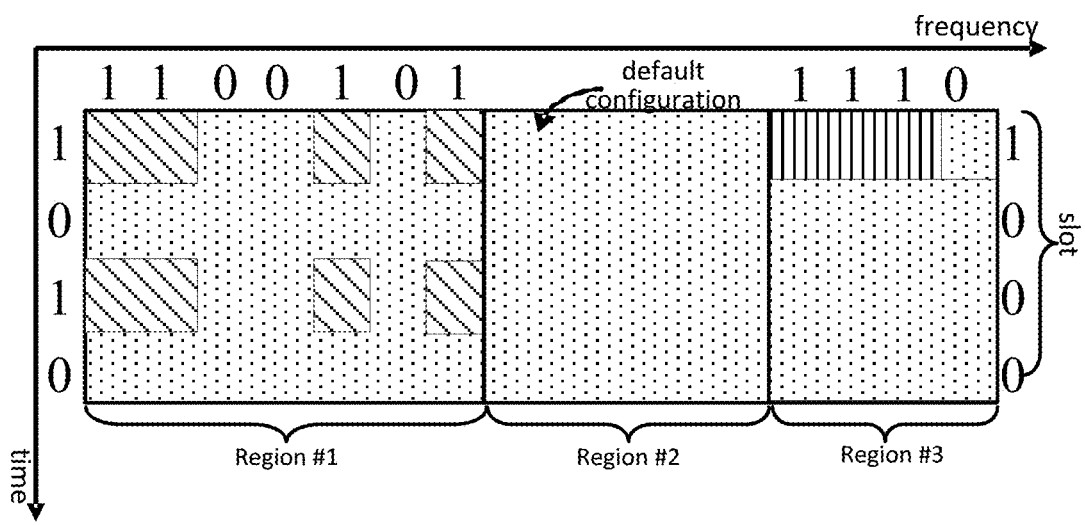
FIG. 4 is a schematic diagram illustrating the reserved resource allocation of a scheduling unit using a bitmap.

The reserved resource allocation can be represented by a bitmap. As illustrated in FIG. 4, the reserved resource allocation in FIG. 3 is illustrated using a bitmap. Accordingly, information representing the reserved resource allocation can be included in the information about available resource for PDSCH. For example, for region #1, a bitmap with "1010" in time domain and "1100101" in frequency domain can be used to represent the reserved resource allocation. For region #2, a default configuration can be set to represent the reserved resource allocation. For region #3, a bitmap with "1000" in time domain and "1110" in frequency domain can be used to represent the reserved resource allocation.

For example, since there is no reserved resource set allocated in region #2, a default configuration can be set for represent this situation. In an implementation, a default configuration is specified for representing this kind of reserved resource allocation. In some implementations, the default configuration can be negotiated by the base station and the UE, and stored in a standard document which can be accessed by the UE. In other implementations, the base station may specify a default configuration for indicating the reserved resource allocation within the region #2, and inform the UE of this default configuration. In this case, the method further includes: specifying a default configuration for indicating the available resource for PDSCH within a frequency region having no reserved resource set allocated therein; and sending the default configuration to the user equipment.

In some implementations, the signaling of the base station could be realized using a couple of options.

Option 1: the signaling is realized by using a (group) common control channel.

Option 2: the signaling is realized by using a dynamic UE-specific control channel.

Option 3: the signaling is realized by using a semi-static higher layer signaling.

The signaling in option 1 or 3 may be group UE/cell/beam specific. The signaling in option 2 is UE specific.

In some implementations, the information about the available resource for PDSCH in the scheduling unit is signaled to the UE using one or a combination of the three options. For example, in an implementation, the information about the available resource for PDSCH in the scheduling unit may be signaled using any one of option 1, option 2 and option 3. For another example, the information about the available resource for PDSCH in the scheduling unit may be signaled first using option 3 so that the UE can obtain candidate reserved resource allocation of the scheduling unit based on the information signaled using option 3, and then information about the available resource for PDSCH in the scheduling unit may be signaled using option 1 and/or option 2 so that the UE can obtain the available resource based on the candidate reserved resource allocation of the scheduling unit and the information signaled using option 1 and/or option 2. The information signaled using option 3 indicates the candidate reserved resource allocation while the information signaled using option 1 and/or option 2 indicates the reserved resource allocation in combination with the candidate reserved resource allocation.

For cross-slot scheduling or semi-persistent scheduling (SPS), the information about the available resource for PDSCH in the scheduling unit is signaled using option 1 and/or option 3.

In some implementations, the information representing the reserved resource allocation of the scheduling unit is a bitmap of 14 bits. For example, in an implementation, a bitmap of 14 bits can be used for representing the reserved resource allocation in a slot, and a bitmap of 28 bits can be used for representing the reserved resource allocation in two slots.

With the method for informing available resource for PDSCH according to an implementation of the present disclosure, by signaling the information about the available resource for PDSCH in the scheduling unit including information representing the reserved resource allocation of the scheduling unit to the user equipment, the base station can inform the UE of the available resource for PDSCH easily.

Figure 5:
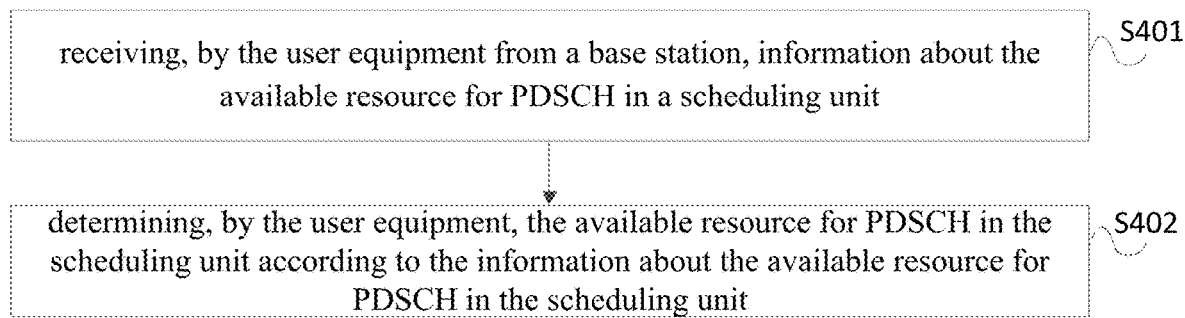
FIG. 5 is a flow chart illustrating a method for determining available resource for PDSCH according to an implementation of the present disclosure.

The present disclosure also provides a method for determining available resource for PDSCH, which can be applied in a user equipment of an NR wireless system. FIG. 5 is a flow chart showing a method for determining available resource for PDSCH according to an implementation of the present disclosure. As illustrated in FIG. 5, the method for determining available resource for PDSCH includes the followings.

At block S401, receiving, by the user equipment from a base station, information about the available resource for PDSCH in a scheduling unit.

The information about the available resource for PDSCH in the scheduling unit includes information representing a reserved resource allocation of the scheduling unit. The reserved resource allocation of the scheduling unit indicates in frequency domain one or more resource sets and indicates in time domain a part of OFDM symbols within the one or more resource sets of the scheduling unit as a reserved resource set, the reserved resource set would not to be used for transmitting the PDSCH.

As illustrated in FIG. 2, for the scheduling unit, there may be three cases of reserved resource allocation. After receiving the information about the available source for PDSCH in the scheduling unit, the UE may analyze the information so as to determine the reserved resource allocation of the scheduling unit.

At block S402, determining, by the user equipment, the available resource for PDSCH in the scheduling unit according to the information about the available resource for PDSCH in the scheduling unit.

In some implementation, for the frequency region having no reserved resource set allocated therein, a default configuration can be set, such that the UE can determine whether there is the frequency region having no reserved resource set in the scheduling unit directly according to the default configuration. In other words, the default configuration is configured to indicate the available resource for PDSCH within a frequency region having no reserved resource set allocated therein.

Since the information about the available resource for PDSCH in the scheduling unit includes information representing the reserved resource allocation of the scheduling unit, and the default configuration indicates the available resource for PDSCH within the frequency region having no reserved resource set, the UE can determine the available resource in the frequency region having no reserved resource set according to the default configuration and determines the available resource in frequency regions other than the frequency region according to the information about the available resource for PDSCH in the scheduling unit.

For example, as illustrated in FIG. 2, for the reserved resource allocation 2, the UE can obtain a default configuration according to which, the UE can determine the available resource for PDSCH of region #2 directly. Although the UE receives the information about available resource for PDSCH in the scheduling unit from the base station, since the UE determines that there is no reserved resource set allocated in region #2, the UE can determine the available resource for PDSCH in region #2 according to the default configuration without further analyzing the information.

The scheduling unit may be a slot or a subframe, which is determined according to specific applications.

In some implementations, the method further includes receiving, by the user equipment, the default configuration from the base station.

The default configuration can be obtained by negotiation between the UE and the base station. Or, in some implementations, the default configuration can be specified by the base station. In this case, the UE receives the default configuration from the base station.

In some implementations, in a scheduling unit, there is no reserved resource set and a default configuration is set for this scheduling unit, it is possible for the base station not to send the information about the available resource for PDSCH in the scheduling unit to the UE. When the information about the available resource for PDSCH in the scheduling unit is not received while the default configuration is obtained, the UE can determine the available resource for PDSCH in the scheduling unit based on the default configuration.

In some implementations, the available resource for PDSCH can be determined as follows.

1. When the UE receives the information about the available resource for PDSCH in the scheduling unit signaled using one of a dynamic common control channel, a UE-specific control channel and a semi-static higher layer signaling, the UE determines the available resource for PDSCH in the scheduling unit according to the information about the available resource for PDSCH in the scheduling unit received using the one of the dynamic common control channel, the dynamic UE-specific control channel and the semi-static higher layer signaling.

In detail, when the UE receives the information about the available resource for PDSCH in the scheduling unit from the (group) common control channel or the UE-specific control channel to indicate the available resource for a particular resource set region or allocated PRBs, the UE determines the available resource for PRBs allocated in the region according to the information signaled using the (group) common control channel or the UE-specific control channel. When the UE receives the information about the available resource for PDSCH in the scheduling unit semi-statically from higher layer to indicate the available resource for a particular resource set region, the UE determines the available resource for all PRBs allocated in the region according to the information semi-statically signaled from higher layer.

2. When the UE receives the information about the available resource for PDSCH in the scheduling unit signaled by using both the semi-static higher layer signaling and one of the dynamic common control channel and the dynamic UE-specific control channel, the UE determines candidate reserved resource allocation of the scheduling unit based on the information signaled using the semi-static higher layer signaling, and determines the available resource for PDSCH according to the candidate reserved resource allocation and the information about the available resource for PDSCH in the scheduling unit latest received using the one of the dynamic common control channel and the dynamic UE-specific control channel.

In detail, when the UE receives the information about the available resource for PDSCH in the scheduling unit from the (group) common control channel or the UE-specific control channel after receiving the information about the available resource for PDSCH in the scheduling unit semi-statically from higher layer, the UE determines candidate reserved resource allocation of the scheduling unit according to the information received semi-statically from higher layer and determines the available resource for PDSCH in the scheduling unit according to the information about the available resource for PDSCH in the scheduling unit from the (group) common control channel or the UE-specific control channel and the candidate reserved resource allocation of the scheduling unit.

3. When the UE receives the information about the available resource for PDSCH in the scheduling unit signaled by the base station using both the dynamic common control channel and the dynamic UE-specific control channel, the UE determines the available resource for PDSCH in the scheduling unit according to the information about the available resource for PDSCH in the scheduling unit received using the dynamic UE-specific control channel.

In some implementations, the information representing the reserved resource allocation of the scheduling unit can be determined as a bitmap of 14 bits. For example, in an implementation, a bitmap of 14 bits can be used for representing the reserved resource allocation in a slot, and a bitmap of 28 bits can be used for representing the reserved resource allocation in 2 slots.

Figure 6:
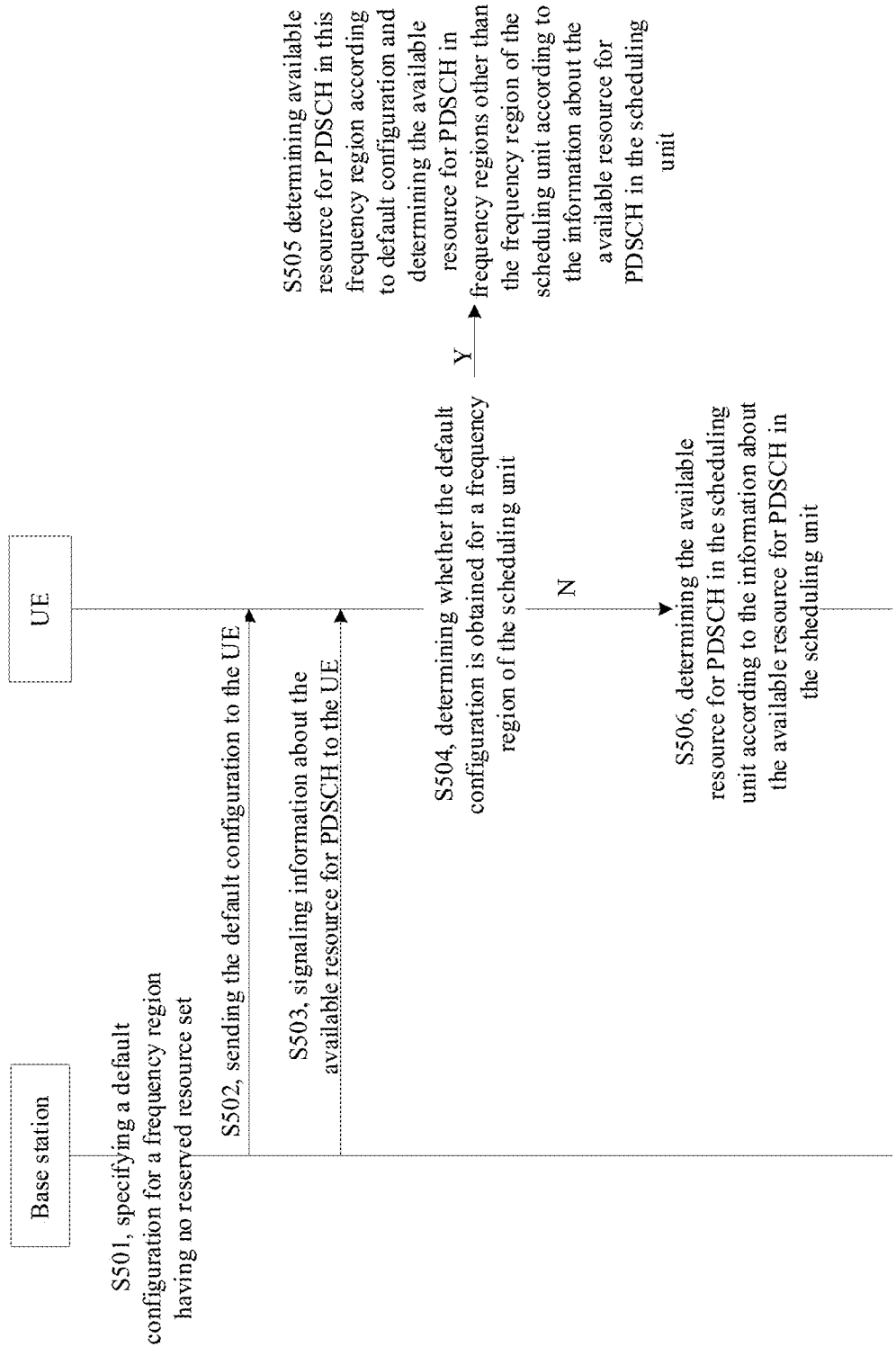
FIG. 6 is a schematic diagram illustrating communications between a base station and a UE according to an implementation of the present disclosure.

FIG. 6 is a schematic diagram showing communications between a base station and a UE according to an implementation of the present disclosure.

At block S501, the base station specifies a default configuration for a frequency region having no reserved resource set.

At block S502, the base station sends the default configuration to the UE.

At block S503, the base station signals information about the available resource for PDSCH in the scheduling unit to the UE.

The information about the available resource for PDSCH in the scheduling unit can be signaled to the UE using a couple of options.

Option 1, the information about the available resource for PDSCH in the scheduling unit is sent using a (group) common control channel.

Option 2, the information about the available resource for PDSCH in the scheduling unit is sent using a dynamic UE-specific control channel.

Option 3, the information about the available resource for PDSCH in the scheduling unit is sent using a semi-static higher layer signaling.

The signaling in option 1 or 3 may be group UE/cell/beam specific. The signaling in option 2 is UE specific.

The above options could be used alone or combined together. For example, the default configuration can be signaled using option 3. The information about the available resource for PDSCH in the scheduling unit can be signaled by option 3 to indicate candidate reserved resource allocation and then can be signaled by option 1 and/or 2 to further indicate the reserved resource allocation.

At block S504, the UE determines whether the default configuration is obtained for a frequency region of the scheduling unit, if yes, act at block S505 is executed.

At block S505, the UE determines available resource for PDSCH in this frequency region according to the default configuration directly and determines available resource for PDSCH in frequency regions other than this frequency region of the scheduling unit according to the information about the available resource for PDSCH in the scheduling unit.

At block S506, the UE determines the available resource for PDSCH in the scheduling unit according to the information about the available resource for PDSCH in the scheduling unit.

When the UE receives the information about the available resource for PDSCH in the scheduling unit signaled using one of the option 1, option 2 and option 3, it will use the information about the available resource for PDSCH in the scheduling unit to determine the available resource.

When the UE receives the information about the available resource for PDSCH in the scheduling unit signaled using option 1 and/or option 2 after receiving that signaled using option 3, it will use the information about the available resource for PDSCH in the scheduling unit signaled using option 3 to determine candidate reserved resource allocation and use the information about the available resource for PDSCH in the scheduling unit signaled using option 1 or option 2 and the candidate reserved resource allocation to determine the available resource.

For cross-slot scheduling or semi-persistent scheduling (SPS), there is no UE-specific control channel in the slot, the UE may assume the available resource for PDSCH in the scheduling unit based on the information about the available resource for PDSCH in the scheduling unit signaled using option 1 or option 3.

With the method for determining available resource for PDSCH according to implementations of the present disclosure, by receiving from the base station the information about the available resource for PDSCH in the scheduling unit, the UE can determine the available resource for PDSCH in the scheduling unit according to the information about the available resource for PDSCH in the scheduling unit. In this way, the UE would know where to start to decode its PDSCH directly and easily.

Implementations of the present disclosure further provide a base station. The base station includes a processor, a memory for storing instructions executable by the processor. The processor is configured to signal to a user equipment information about the available resource for PDSCH in a scheduling unit according to a reserved resource allocation of the scheduling unit. The reserved resource allocation of the scheduling unit indicates in frequency domain one or more resource sets and indicates in time domain a part of OFDM symbols within the one or more resource sets of the scheduling unit as a reserved resource set, and the information about the available resource for PDSCH in the scheduling unit includes information representing the reserved resource allocation of the scheduling unit, the reserved resource set would not to be used for transmitting the PDSCH.

With the base station according to implementations of the present disclosure, the base station signals information about the available resource for PDSCH in the scheduling unit to the UE according to the reserved resource allocation of the scheduling unit. The reserved resource allocation of the scheduling unit indicates in frequency domain one or more resource sets and indicates in time domain a part of OFDM symbols within the one or more resource sets of the scheduling unit as a reserved resource set which would not to be used for transmitting the PDSCH. The information about the available resource for PDSCH in the scheduling unit includes information for representing the reserved resource allocation of the scheduling unit. In this way, the base station can inform the UE of the available resource for PDSCH, such that the UE would know where to start to decode its PDSCH directly and easily.

Implementations of the present disclosure further provide a UE. The UE device includes a processor, a memory for storing instructions executable by the processor. The processor is configured to receive from a base station information about the available resource for PDSCH in the scheduling unit, in which the information about the available resource for PDSCH in the scheduling unit includes information representing a reserved resource allocation of the scheduling unit, and the reserved resource allocation of the scheduling unit indicates in frequency domain one or more resource sets and indicates in time domain a part of OFDM symbols within the one or more resource sets of the scheduling unit as a reserved resource set which would not to be used for transmitting the PDSCH; and determine the available resource for PDSCH in the scheduling unit according to the information about the available resource for PDSCH in the scheduling unit.

With the UE according to implementations of the present disclosure, the UE receives from the base station the information about the available resource for PDSCH in the scheduling unit, in which the information about the available resource for PDSCH includes information representing a reserved resource allocation of the scheduling unit, and the reserved resource allocation of the scheduling unit indicates in frequency domain one or more resource sets and indicates in time domain a part of OFDM symbols within the one or more resource sets of the scheduling unit as a reserved resource set which would not to be used for transmitting the PDSCH, and the UE determines the available resource for PDSCH in the scheduling unit according to the information about the available resource for PDSCH in the scheduling unit. In this way, the UE would know where to start to decode its PDSCH directly and easily.

Reference throughout this specification to "an implementation," "some implementations," "an example," "a specific example," or "some examples," means that a particular feature, structure, material, or characteristic described in connection with the implementation or example is included in at least one implementation or example of the present disclosure. In this specification, exemplary descriptions of aforesaid terms are not necessarily referring to the same implementation or example. Furthermore, the particular features, structures, materials, or characteristics may be combined in any suitable manner in one or more implementations or examples. Moreover, those skilled in the art could combine different implementations or different characteristics in implementations or examples described in the present disclosure.

In addition, terms such as "first" and "second" are used herein for purposes of description and are not intended to indicate or imply relative importance or significance or to imply the number of indicated technical features. Thus, the features defined with "first" and "second" may comprise or imply at least one of these features. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred implementation of the present disclosure includes other realizations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above implementations, a plurality of steps or methods may be realized by the software or firmware stored in the memory and executed by the appropriate instruction execution system. For example, if it is realized by the hardware, likewise in another implementation, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method implementations of the present disclosure when running on a computer.

In addition, each function cell of the implementations of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although implementations of present disclosure have been shown and described above, it should be understood that above implementations are just explanatory, and cannot be construed to limit the present disclosure, for those skilled in the art, changes, alternatives, and modifications can be made to the implementations without departing from spirit, principles and scope of the present disclosure.

What is claimed is:

1. A method for informing available resource for PDSCH, comprising:
    signaling, by a base station to a user equipment, information about the available resource for Physical Downlink Shared Channel (PDSCH) in a scheduling unit according to a reserved resource allocation of the scheduling unit;
    wherein the reserved resource allocation of the scheduling unit indicates in frequency domain one or more resource sets and indicates in time domain a part of Orthogonal Frequency Division Multiplexing (OFDM) symbols within the one or more resource sets of the scheduling unit as a reserved resource set, and
    the information about the available resource for PDSCH in the scheduling unit includes information representing the reserved resource allocation of the scheduling unit, wherein the reserved resource set would not to be used for transmitting the PDSCH;
    wherein signaling the information about the available resource for PDSCH in the scheduling unit comprises:
    signaling the information about the available resource for PDSCH in the scheduling unit by using one of a dynamic common control channel, a dynamic UE-specific control channel and a semi-static higher layer signaling; or
    signaling the information about the available resource for PDSCH in the scheduling unit by using both the semi-static higher layer signaling and one of the dynamic common control channel and the dynamic UE-specific control channel; or
    signaling the information about the available resource for PDSCH in the scheduling unit by using both the dynamic common control channel and the dynamic UE-specific control channel.

2. The method according to claim 1, further comprising:
    specifying a default configuration for indicating the available resource for PDSCH within a frequency region having no reserved resource set allocated therein; and
    sending the default configuration to the user equipment.

3. The method according to claim 2, wherein the reserved resource set is a control resource set configured for the user equipment.

4. The method according to claim 1, wherein the signaling by the base station is able to be realized using at least one of the following three options:
    a dynamic common control channel;
    a dynamic UE-specific control channel; and
    a semi-static higher layer signaling.

5. The method according to claim 4, wherein the information about the available resource for PDSCH is able to be signaled using one or a combination of the three options.

6. The method according to claim 5, wherein for a cross-slot scheduling or a semi-persistent scheduling, the information about the available resource for PDSCH is signaled using at least one of the semi-static higher layer signaling and the dynamic common control channel.

7. The method according to claim 1, wherein the information representing the reserved resource allocation of the scheduling unit is a bitmap of 14 bits.

8. The method according to claim 1, wherein the available resource is for a particular resource set region or allocated Physical Resource Blocks.

9. A method for determining available resource for PDSCH, comprising:
    receiving, by the user equipment, information about the available resource for Physical Downlink Shared Channel (PDSCH) in a scheduling unit,
    wherein the information about the available resource for PDSCH in the scheduling unit includes information representing a reserved resource allocation of the scheduling unit,
    wherein the reserved resource allocation of the scheduling unit indicates in frequency domain one or more resource sets and indicates in time domain a part of Orthogonal Frequency Division Multiplexing (OFDM) symbols within the one or more resource sets of the scheduling unit as a reserved resource set, the reserved resource set would not to be used for transmitting the PDSCH; and
    determining, by the user equipment, the available resource for PDSCH in the scheduling unit according to the information about the available resource for PDSCH in the scheduling unit;

wherein determining by the user equipment the available resource for PDSCH in the scheduling unit according to the information about the available resource for PDSCH in the scheduling unit comprises:

when the information about the available resource for PDSCH in the scheduling unit is received from a base station using one of a dynamic common control channel, a dynamic UE-specific control channel and a semi-static higher layer signaling, determining the available resource for PDSCH in the scheduling unit according to the information about the available resource for PDSCH in the scheduling unit; or when the information about the available resource for PDSCH in the scheduling unit is received from the based station using both the semi-static higher layer signaling and one of the dynamic common control channel and the dynamic UE-specific control channel, determining the available resource for PDSCH in the scheduling unit according to the information about the available resource for PDSCH in the scheduling unit latest received using the one of the dynamic common control channel and the dynamic UE-specific control channel after determining candidate reserved resource allocation in the scheduling unit according to the information about the available resource for PDSCH in the scheduling unit received using the semi-static higher layer signaling; or when the information about the available resource for PDSCH in the scheduling unit is received from the based station using both the dynamic common control channel and the dynamic UE-specific control channel, determining the available resource for PDSCH in the scheduling unit according to the information about the available resource for PDSCH in the scheduling unit received using the dynamic UE-specific control channel.

10. The method according to claim 9, wherein the information representing the reserved resource allocation of the scheduling unit is a bitmap of 14 bits.

11. The method according to claim 9, wherein the available resource is for a particular resource set region or allocated Physical Resource Blocks.

12. A base station, comprising:
a processor; and
a memory for storing instructions executable by the processor;
wherein the processor is configured to:
signal, to a user equipment, information about available resource for Physical Downlink Shared Channel (PDSCH) in a scheduling unit according to a reserved resource allocation of the scheduling unit;
wherein the reserved resource allocation of the scheduling unit indicates in frequency domain one or more resource sets and indicates in time domain a part of Orthogonal Frequency Division Multiplexing (OFDM) symbols within the one or more resource sets of the scheduling unit as a reserved resource set, and
the information about the available resource for PDSCH in the scheduling unit includes information representing the reserved resource allocation of the scheduling unit,
wherein the reserved resource set would not to be used for transmitting the PDSCH;

wherein the processor is configured to signal, to the user equipment, the information about the available resource for PDSCH in the scheduling unit in the following way:

signaling the information about the available resource for PDSCH in the scheduling unit by using one of a dynamic common control channel, a dynamic UE-specific control channel and a semi-static higher layer signaling; or signaling the information about the available resource for PDSCH in the scheduling unit by using both the semi-static higher layer signaling and one of the dynamic common control channel and the dynamic UE-specific control channel; or signaling the information about the available resource for PDSCH in the scheduling unit by using both the dynamic common control channel and the dynamic UE-specific control channel.

13. The base station according to claim 12, wherein the processor is configured to:
specify a default configuration for indicating the available resource for PDSCH within a frequency region having no reserved resource set allocated therein; and
send the default configuration to the user equipment.

14. The base station according to claim 12, wherein the reserved resource set is a control resource set configured for the user equipment.

15. The base station according to claim 12, wherein the processor is configured to signal the information by using at least one of the following three options:
a dynamic common control channel;
a dynamic UE-specific control channel; and
a semi-static higher layer signaling.

16. The base station according to claim 15, wherein the processor is configured to signal the information about the available resource for PDSCH by using one or a combination of the three options.

17. The base station according to claim 16, wherein the processor is configured to, for a cross-slot scheduling or a semi-persistent scheduling, signal the information about the available resource for PDSCH by using at least one of the semi-static higher layer signaling and the dynamic common control channel.

18. The base station according to claim 12, wherein the information representing the reserved resource allocation of the scheduling unit is a bitmap of 14 bits.

19. The base station according to claim 12, wherein the scheduling unit is a slot or a subframe.

20. The base station according to claim 12, wherein the available resource is for a particular resource set region or allocated Physical Resource Blocks.

21. The base station according to claim 12, wherein the reserved resource set is a control resource set configured for the user equipment.

22. A user equipment, comprising:
a processor; and
a memory for storing instructions executable by the processor;
wherein the processor is configured to:
receive information about available resource for Physical Downlink Shared Channel (PDSCH) in a scheduling unit,
wherein the information about the available resource for PDSCH in the scheduling unit includes information representing a reserved resource allocation of the scheduling unit, wherein the reserved resource allocation of the scheduling unit indicates in frequency domain one or more resource sets and indicates in time domain a part of Orthogonal Frequency Division Multiplexing (OFDM) symbols within the one or more resource sets of the scheduling unit as a reserved resource set, the reserved resource set would not to be used for transmitting the PDSCH; and determine the available resource for PDSCH in the scheduling unit according to the information about the available resource for PDSCH in the scheduling unit;

when the information about the available resource for PDSCH in the scheduling unit is received from a base station using one of a dynamic common control channel, a dynamic UE-specific control channel and a semi-static higher layer signaling, determine the available resource for PDSCH in the scheduling unit according to the information about the available resource for PDSCH in the scheduling unit; or when the information about the available resource for PDSCH in the scheduling unit is received from the based station using both the semi-static higher layer signaling and one of the dynamic common control channel and the dynamic UE-specific control channel, determine the available resource for PDSCH in the scheduling unit according to the information about the available resource for PDSCH in the scheduling unit latest received using the one of the dynamic common control channel and the dynamic UE-specific control channel after determining candidate reserved resource allocation in the scheduling unit according to the information about the available resource for PDSCH in the scheduling unit received using the semi-static higher layer signaling; or when the information about the available resource for PDSCH in the scheduling unit is received from the based station using both the dynamic common control channel and the dynamic UE-specific control channel, determine the available resource for PDSCH in the scheduling unit according to the information about the available resource for PDSCH in the scheduling unit received using the dynamic UE-specific control channel.

23. The user equipment according to claim 22, wherein the processor is configured to:

receive a default configuration, wherein the default configuration is configured to indicate the available resource for PDSCH within a frequency region having no reserved resource set allocated therein; and determine the available resource for PDSCH in the scheduling unit according to the information about the available resource for PDSCH in the scheduling unit and the default configuration.

24. The user equipment according to claim 23, wherein the available resource is for a particular resource set region or allocated Physical Resource Blocks.

25. The user equipment according to claim 22, wherein the information representing the reserved resource allocation of the scheduling unit is a bitmap of 14 bits.

26. The user equipment according to claim 22, wherein the scheduling unit is a slot or a subframe.

* * * * *